United States Patent
Wheeler et al.

(10) Patent No.: US 7,634,762 B1
(45) Date of Patent: Dec. 15, 2009

(54) SELECTIVE POST-COMPILE CONVERSION

(75) Inventors: Ross Wheeler, Paradise Valley, AZ (US); Ning Li, Sequim, WA (US); George Verbitsky, Mountain View, CA (US)

(73) Assignee: Paravirtual Corp., Santa Clara, CA (US)

( * ) Notice: Subject to any disclaimer, the term of this patent is extended or adjusted under 35 U.S.C. 154(b) by 1144 days.

(21) Appl. No.: 11/110,089

(22) Filed: Apr. 19, 2005

(51) Int. Cl.
*G06F 9/45* (2006.01)

(52) U.S. Cl. ...................................................... 717/136
(58) Field of Classification Search .................. 717/136
See application file for complete search history.

(56) References Cited

U.S. PATENT DOCUMENTS

| | | | |
|---|---|---|---|
| 4,959,779 A | 9/1990 | Weber et al. | |
| 5,398,328 A | 3/1995 | Weber et al. | |
| 5,408,664 A | 4/1995 | Zarrin et al. | |
| 5,519,842 A | 5/1996 | Atallah et al. | |
| 5,687,337 A | 11/1997 | Carnevale et al. | |
| 5,781,763 A | 7/1998 | Beukema et al. | |
| 5,828,884 A | 10/1998 | Lee et al. | |
| 5,867,690 A | 2/1999 | Lee et al. | |
| 6,751,583 B1 * | 6/2004 | Clarke et al. | 703/17 |
| 2004/0009813 A1 * | 1/2004 | Wind | 463/30 |

\* cited by examiner

*Primary Examiner*—John Chavis
(74) *Attorney, Agent, or Firm*—Fernandez & Associates, LLP

(57) ABSTRACT

Method and apparatus for selective post-compile conversion of data protocol-specific source code elements to restore the intended functionality of the source code without requiring precompilation alteration of the latter. Byte-ordering dependent source code issues may be addressed using the current invention, possibly requiring the alteration, deletion and/or addition of one or more instructions to the post-compile output. Invention may enable portability of software programs from a first processor platform and OS to a second environment such as a second hardware and OS or a simulated, emulated or virtualized environment representing a second hardware architecture, by compiling the software program source code according to the second environment and selectively converting the data protocol specific code elements in the object/executable file, produced by the aforementioned compilation, to restore their intended functionality.

23 Claims, 2 Drawing Sheets

---

Post-compile output comprising conversion targets associated with data protocol-specific source code is received (Step 100).

Conversion targets associated with a first protocol are selectively identified in the post-compile output based on one or more selection criteria (Step 110).

Selectively identified conversion targets are processed to restore the intended functionality of the source code element for operation on the second hardware architecture (Step 120).

Optionally, libraries may be processed to restore the intended functionality of the library (Step 130).

Optionally, linker and/or loader output is processed to restore the intended functionality of the source code elements and/or library functions (Step 140).

Post-compile output comprising conversion targets associated with data protocol-specific source code is received (Step 100).

Conversion targets associated with a first protocol are selectively identified in the post-compile output based on one or more selection criteria (Step 110).

Selectively identified conversion targets are processed to restore the intended functionality of the source code element for operation on the second hardware architecture (Step 120).

Optionally, libraries may be processed to restore the intended functionality of the library (Step 130).

Optionally, linker and/or loader output is processed to restore the intended functionality of the source code elements and/or library functions (Step 140).

Figure 1

SELECTIVE POST-COMPILE CONVERSION

CROSS-REFERENCE TO RELATED APPLICATION

This application cross-references U.S. Non-provisional patent application Ser. No. 10/828,648 ("Embedded Supersystem Virtualization Using Fast System Equivalent Architecture", Wheeler et. al) filed on Apr. 20, 2004 and is incorporated in full herein by reference.

FIELD

Invention relates to computer processing, and in particular to selective post-compile conversion of data protocol specific elements.

RELATED ART

Portability of software programs from one processor platform and operating system (OS) to another hardware and OS may be accomplished by a variety of means. For example, in some cases, a portable application that has been written, compiled and linked for use on an first hardware architecture running a first operating system may be ported to a second hardware architecture running a second operating system by recompiling the source for the second hardware architecture and re-linking with the appropriate libraries associated with the second operating system. Many compilers have a switch for identifying a target Central Processing Unit (CPU) architecture for this purpose. However, not all applications are easy to port and some porting issues may be associated with data protocol issues such as, but not limited to, big-endian and little-endian related data ordering protocols.

For example, in some cases, a networking application written for embedded big-endian hardware architectures may incorporate big-endian dependent code. Re-compiling for operation on a little-endian machine may result in improper memory accesses and/or corrupted functionality. In some cases, this problem may be addressed by manually sifting through source code to identify problematic source elements and then altering the source before compilation. This type of approach can be time consuming and error-prone. In addition, in some industries, there is a strong aversion to altering source code. In some cases, this may be due to concerns about unintended side-effects of code changes and/or complexities associated with establishing and maintaining effective test and verification hardware configurations. Furthermore, some techniques based on re-compiling are not easily adaptable for enabling the operation of a software program in emulation, simulation and/or virtual environments; this may be especially problematic when the data protocols associated with the embedded host computing platform and the emulation, simulation or virtual environment operate according to different data protocols.

SUMMARY

According to the current invention, data protocol-specific source code elements may be selectively converted to restore their intended functionality after compiling, without requiring pre-compilation alteration of the source code. For example, by processing post-compile and/or post-link code (such as binary or object code) instead of directly editing hardware dependent source code and re-compiling, some unintended side effects may be minimized. In some cases, the data protocol-specific source code elements may comprise hard coded memory addresses related to direct data accesses, instructions, memory addresses, socket addresses, network addresses, pointers and hard-coded data. Data protocol-specific issues such as data ordering protocol incompatibilities related to byte-ordering and/or bit-ordering may be addressed using the current invention. In some examples according to the current invention, special care may be taken to insure that some referenced function pointers are not converted.

In some examples according to the current invention, restoring the intended functionality of some source code elements may require altering, deleting and/or adding one or more instructions to the post-compile output. In some cases, post-compile output such as, but not limited to, a symbol table, may be altered to preserve functionality in downstream operations such as, but not limited to, debugging. In some cases, post-compile output such as, but not limited to, a symbol table, an import directory and/or a linkage table, may be altered to enable, preserve and/or restore the functionality of libraries in conjunction with post-compile output processed according to the current invention.

In some cases, the current invention may enable portability of software programs written for a first processor platform and operating system (OS) to a second hardware and OS by taking the software program source code, compiling it on the second processor platform and OS and selectively converting the data protocol specific code elements in the object/executable file, produced by the aforementioned compilation, to restore their intended functionality.

In some cases, the current invention may enable the operation of software intended for a first hardware architecture to operate in a simulated, emulated or virtualized environment representing a second hardware architecture. In some cases, libraries designed to operate on the host computing environment may be used in conjunction with converted software running in the virtual hardware system; in some cases, a customized linker and/or loader may be implemented to facilitate linking and/or loading libraries operating on the host computing environment with software running in the virtualized hardware system.

BRIEF DESCRIPTION OF DRAWINGS

FIG. 1 illustrates an example method according to the current invention for restoring the intended functionality of data protocol-specific source code elements without requiring pre-compilation alteration of the source code.

DETAILED DESCRIPTION

Figure 2:
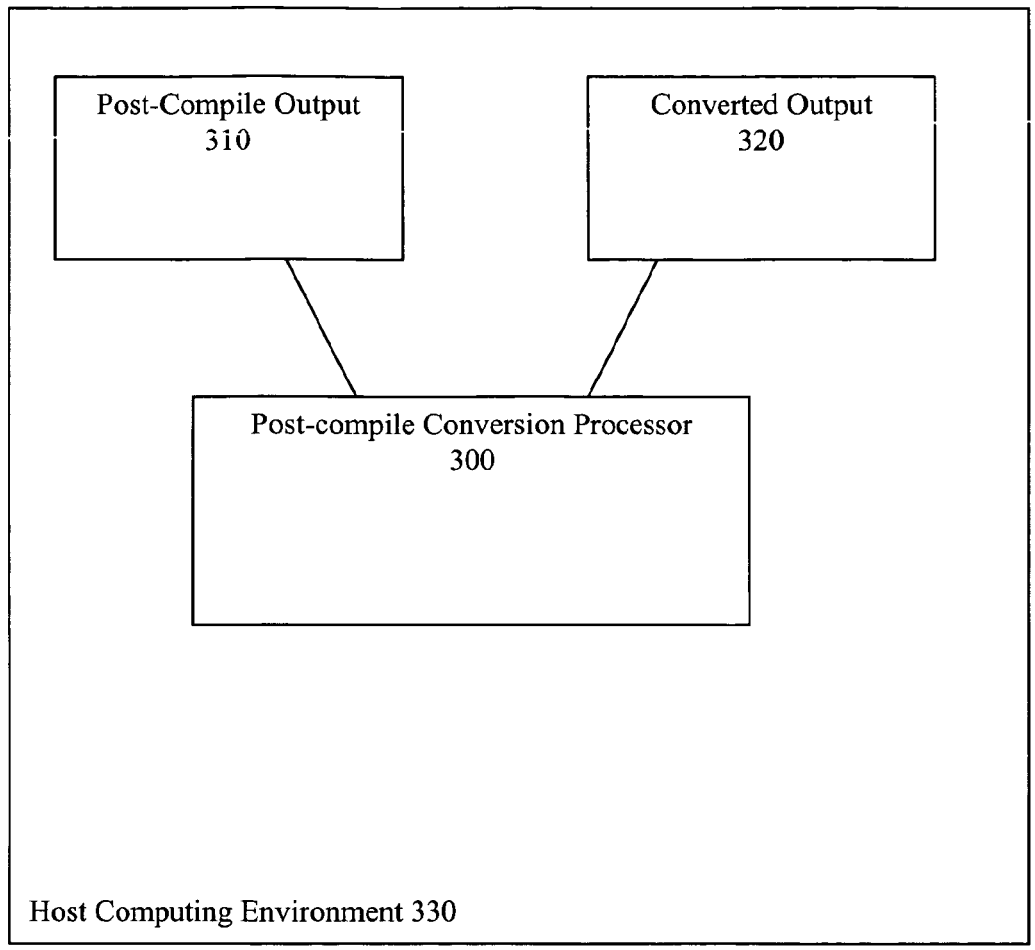
FIG. 2 illustrates an example of a post-compile conversion processor according to the current invention for restoring the intended functionality of data protocol-specific source code elements without requiring pre-compilation alteration of the source code.

FIG. 1 illustrates an example method according to the current invention for restoring the intended functionality of data protocol-specific source code elements without requiring pre-compilation alteration of the source code. The process begins when post-compile output comprising conversion targets associated with data protocol-specific source code is received (Step 100). Post-compile output may comprise output from a compiler, processed compiler output and/or output from a linker. In some cases, the post-compile output may represent software such as, but not limited to, a computer program or a software library and may be represented in formats such as, but not limited to, assembly language, machine language, binary and/or hexadecimal format. Data protocol-specific source code may comprise elements such as, but not limited to, a hard-coded data, memory, network or socket address, an explicit pointer value, a character, an integer, a floating point number, a character, a string, and initialized data. Examples of data protocols include, but are not limited to: byte ordering protocols and bit ordering protocols.

According to the big-endian byte ordering protocol, the most significant byte has the lowest address in multi-byte data structures or multi-byte data types. According to the little-endian byte ordering protocol, the least significant byte has the lowest address in multi-byte data structures or multi-byte data types. The Java Virtual Machine (JVM) as well as processors such as the IBM 370 family, the PDP-10 and the Motorola microprocessor families are big-endian. Processors such Intel microprocessors, VAX family processors and the PDP-11 are little-endian. Some processors such as the PowerPC architecture are considered "bi-endian" because they can be configured to operate according to either the big-endian or little-endian protocol.

Two common bit ordering protocols are "up bit ordering" (also known as normal bit ordering) and "down bit ordering (also known as reverse bit ordering). In the up bit ordering protocol, the least significant bit is stored in the first bit; in the down bit ordering protocol, the most significant bit is stored in the first bit. Converting between these two protocols requires bit reversal. Normal bit direction is often used in transmitting data between devices, such as FAX machines and printers, and for storing un-encoded bitmapped data. Reverse bit direction is often used to communicate data to display devices and in many data compression encoding methods.

When source code containing data protocol-specific elements associated with a first protocol is processed for operation with a second protocol, the intended functionality of data protocol-specific elements may be corrupted. For example, this may be an issue when software associated with big-endian embedded systems is ported to a little-endian desktop system for direct operation on the little-endian desktop system or for operation in a simulation, virtualization or emulation environment supported by the little-endian desktop system. In this example, consider the case of source code written according to a big-endian data protocol for operation on big-endian embedded hardware. In an effort to port this software to a little-endian desktop system according to a little-endian data protocol, the software may be recompiled on a little-endian system according to the little-endian protocol, thereby creating processed source code. In some cases, the intended functionality of this source code may be corrupted by this process; in this case, the processed source code may comprise conversion targets with potentially corrupted functionality due to differences between the first data protocol and the second data protocol. For example, if the source code comprises instructions referring to direct memory accesses, a compiler may byte-swap the direct memory access pointers during the re-compilation process, resulting in corrupted functionality. In this example, potential conversion targets comprise the instructions in the recompiled object code based on direct memory accesses. A potential conversion target is a segment of a processed (for example, compiled or compiled and linked) source code with potentially corrupted functionality due to differences between data protocols. In some cases, the data protocols may be associated with hardware architectures of the host machines. However, in other cases, the data protocol may be associated with stored, generated, accessed and/or received data structures and/or data streams that may be accessed by, generated by and/or operated on according to source code software instructions. Furthermore, in some cases, corruption due to data protocol differences may or may not be associated with simulators, emulators and/or virtualized hardware environments that may simulate, emulate and/or virtually operate based on a hardware architecture and/or data protocol.

In the previous example, the source code containing little-endian specific elements is processed and linked for operation with a big-endian specific system and the steps of processing and linking are executed on the big-endian specific system. However, in other examples according to the current invention, the steps of processing and/or linking the source code may or may not be executed on a hardware architecture associated with the second protocol.

In some cases, the received post-compile output is generated by a module such as, but not limited to, a compiler, linker or assembler/linker. For example, a linker may receive processed source code, binary code or object code from another module such as, but not limited to, a compiler. The linker may then generate loadable and/or executable code. For example, a linker may combine one or more object code files and optionally link these with a runtime library to generate loadable and/or executable code, creating a linkage table.

The process continues when conversion targets associated with a first protocol are selectively identified in the post-compile output based on one or more selection criteria (Step 110). In this step, the post-compile output is scanned to locate conversion targets with potentially corrupted functionality due to differences between data protocols. For example, in some cases, a selection criterion may identify all initialized scalars as conversion targets. In some cases, when byte ordering protocols differ between the first protocol and the second protocol, a selection criterion may be used to selectively identify initialized scalars occupying more than one byte of memory for additional processing whereas initialized scalars occupying one byte of memory may not be considered conversion targets. Initialized arrays of scalars or objects occupying more than one byte may be selectively identified for additional processing. For example, considering source code from a C++ program, the global definition "short arr[3]={0x1234, 0x2345, 0x3456};" initializes an array of three short integers wherein each short integer occupies 2 bytes. In cases where byte ordering protocols differ between the first protocol and the second protocol, each element of this array may be selectively identified for additional processing whereas an initialized string of one byte chars or an array of one byte chars in a C++ global definition such as: "char c[3]={0x12, 0x34, 0x56};" may not be considered a conversion target. In some cases where bit ordering protocols differ between the first protocol and the second protocol, all initialized scalars may be identified for additional processing. In some cases, a symbol table may be used to help identify, locate, confirm and/or selectively identify conversion targets. For example, in some cases, a symbol table may be carefully reviewed to help selectively identify conversion targets such as data targets requiring future processing such as byte swapping while separately identifying function pointers, which may require different future processing steps to restore intended functionality.

The process continues when selectively identified conversion targets are processed to restore the intended functionality of the source code element for operation according to the second data protocol (Step 120). In some cases, the intended functionality of some source code elements may be restored through minor alterations in binary or object code; for example, restoring intended functionality may entail simply swapping bytes in a scalar. However, in some cases, restoring the intended functionality of some source code elements may require altering, deleting and/or adding one or more instructions to the post-compile output. For example, in a case where the byte ordering protocol differs between two hardware architectures, restoring source code functionality represented by the following Intel assembly language instruction:

```
addw %bx,(%eax)    # add BX to a two byte WORD in the memory
                   # location pointed to by EAX
``` may require rearranging (swapping) bytes in data segment in memory and replacing the original instruction with multiple assembly instructions, such as:

```
push %ecx          # save the contents of ECX on the stack
mov (%eax), %cx    # move a two byte WORD from the memory
                     location
                   # pointed by EAX into CX
xchg %cl, %ch      # swap 2 bytes of CX
addw %bx, %cx      # add BX to CX
xchg %cl, %ch      # swap 2 bytes of CX
mov %cx, (%eax)    # move CX into memory two byte WORD pointed
                     by EAX
pop %ecx           # restore ECX
```

In other examples, one or more objects and/or instructions may be added, altered, replaced, and/or deleted to restore functionality. Optionally, in some cases, post-compile output such as, but not limited to, a symbol table and/or linkage table may require alteration. For example, in some cases, when instructions are inserted or deleted from an object file, symbol tables may require alteration to enable and/or maintain functionality in downstream processing such as, but not limited to, debugging. For example, inserting a single instruction into a binary or object code file may require a corresponding shift in some symbol addresses or locations in order to maintain functionality in a subsequent debugging step. In other examples according to the current invention, items may be relocated and/or rearranged in such executable and linking format data structures as, but not limited to, the symbol and/or relocation tables.

In some cases, the current invention may enable portability of software programs written for a first processor platform and operating system (OS) to a second hardware and OS. For example, by taking the software program source code, compiling it on the second processor platform and OS and selectively converting the data protocol specific code elements in the object/executable file, produced by the aforementioned compilation, to restore their intended functionality. In this case, a suitable compiler is capable of operating on the second hardware system and OS In some cases, the current invention may be used in conjunction with a simulation, emulation and/or virtualization system. For example, a virtual hardware environment such as the system disclosed in US Non-Provisional Patent Application "Embedded Supersystem Virtualization Using Fast System Equivalent Architecture", Wheeler et. al. (application Ser. No. 10/828,648) may establish a virtual "big-endian" hardware environment on a "little-endian" host hardware platform, enabling big-endian compiled code to operate on a little-endian hardware platform. In some cases, the big-endian compatible post-compile output may be linked with libraries and software associated with the virtualization environment. However, according to the current invention, in some cases, the big-endian compatible post-compile output may be linked and/or loaded with little-endian compatible libraries and/or software associated with the little-endian host hardware platform such as, but not limited to, standard C-libraries. Because function pointers must be compatible with the operative data protocol of the host hardware platform (in this example, a little-endian host), additional processing may be required during and/or after the steps of linking and/or loading libraries in order to pre-swap function pointer addresses which are written according to a different protocol (in this case, the post-compile output was written according to a big-endian protocol). In order to interoperate with the received post-compile output (which operates based on a different data protocol than the host hardware platform) one or more relocation items may be established for pre-swapping the pointer addresses from the hardware platform data protocol to an address consistent with the received post-compile output protocol. In this way, the virtual hardware system may accurately locate the functions at run time. In some cases, this may be achieved using a customized linker and/or loader; however, in other examples according to the current invention, library interoperability may be established independently of a standard linker and/or loader. In some cases, dependency on special purpose compilers may be reduced by using a simulation, emulation and/or virtualization system in conjunction with the current invention.

FIG. 2 illustrates an example of a post-compile conversion processor 300 according to the current invention for restoring the intended functionality of data protocol-specific source code elements without requiring pre-compilation alteration of the source code. In this example, a post-compile conversion processor 300 according to the current invention operates on a host computing environment 330. The post-compile conversion processor may be implemented in hardware, software and/or firmware. For example, in some cases, a post-compile conversion processor may be implemented wholly or in-part using application specific integrated circuits (ASICs), field programmable gate arrays (FPGAs) and/or integrated circuits (ICs). In the example illustrated in FIG. 2, post-compile conversion processor 300 operates on a host-computing environment 330 such as, but not limited to, one or more computing devices, computers, servers, routers, bridges, gateways or special purpose hardware platforms. In some cases, a distributed implementation may be enabled by coupling and/or networking computing devices, computers, servers, routers, bridges, gateways and/or special purpose hardware platforms. However, in other examples according to the current invention, a stand-alone post-compile conversion processor may be implemented for operation independent of a host-computing environment.

In the example illustrated in FIG. 2, post-compile conversion processor 300 is coupled to a single post-compile output 310 storage and a single converted output 320 storage wherein the post-compile conversion processor 300, post-compile output 310 and converted output 320 are all disposed on the same host-computing environment 330. In this example, post-compile conversion processor 300 accesses post compile output comprising conversion targets associated with data protocol-specific source code from post-compile output 310 storage. In this example, a single post-compile output 310 comprises a storage component and is co-located on host computing environment 330 with the post-compile conversion processor 300. However, in other examples according to the current invention, the post-compile output may comprise one or more local, remote and/or distributed stores. In some cases, the post-compile output may be provided to the post-compile conversion processor 300 as an input buffer or stream. According to the current invention, the post-compile conversion processor selectively identified conversion targets associated with a first data protocol in the post-compile output based on one or more selection criteria. The post-compile conversion processor processes selectively identifies conversion targets to restore the intended functionality of the source code element for operation on a second hardware architecture. The post-compile conversion processor produces processed source code. In the example illustrated in FIG. 2, the processed source code may be transferred to converted output 320, implemented as a single storage component co-located with both the post-compile conversion processor 300 and the single post-compile output 310 storage. However, in other examples according to the current invention, the converted output may comprise one or more local, remote and/or distributed stores. In some cases, the converted output may be emitted by the post-compile conversion processor 300 into an output buffer or as an output stream. It is envisioned that in some cases, the post-compile conversion processor may be remotely, locally, dynamically, statically, automatically and/or adaptively configurable and/or reconfigurable.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by Claims following.

We claim:

1. A method for selective post-compile conversion of data protocol specific elements comprising the steps of:
   receiving post-compile output, said post-compile output comprising processed source code, wherein:
      said source code comprising one or more source code elements with intended functionality associated with a first data protocol; and,
      said source code has been processed to produce processed source code, said processed source code comprising instructions consistent with a hardware architecture associated with a second data protocol, thereby creating conversion targets with potentially corrupted functionality due to differences between the first data protocol and the second data protocol;
   selectively identifying conversion targets associated with a first data protocol in the post-compile output based on one or more selection criteria;
   altering the processed source code to restore the intended functionality of the source code element for operation according to a hardware architecture associated with a second data protocol, thereby enabling the operation of processed source code according to the second hardware architecture without requiring pre-compilation alteration of the source code.

2. The method of claim 1 wherein:
the hardware architecture associated with the first data protocol comprises an embedded system.

3. The method of claim 1 wherein:
said post-compile output comprises processed source code, wherein:
   said source code comprising one or more source code elements with intended functionality associated with a first data protocol; and,
   said source code has been compiled on a hardware platform with a second hardware architecture consistent with the second data protocol to produce processed source code, thereby creating conversion targets with potentially corrupted functionality due to differences between the first data protocol and the second data protocol.

4. The method of claim 1 wherein:
the first data protocol and the second data protocol use different byte-ordering protocols.

5. The method of claim 4 wherein:
the step of altering comprises altering the byte order of at least some portion of the conversion target.

6. The method of claim 1 wherein:
a conversion target comprises one or more instructions in the processed source code.

7. The method of claim 1 wherein:
the step of altering comprises altering one or more instructions in the processed source code.

8. The method of claim 1 wherein:
the step of altering comprises deleting one or more instructions in the processed source code.

9. The method of claim 1 wherein:
the step of altering comprises adding one or more instructions in the processed source code.

10. The method of claim 1 wherein:
a conversion target comprises a scalar type.

11. The method of claim 10 wherein:
a conversion target comprises a scalar type object that is part of an aggregate type object.

12. The method of claim 4 wherein:
a conversion target comprises an object occupying more than one byte in memory.

13. The method of claim 1 wherein:
the first data protocol and the second data protocol use different bit-ordering protocols.

14. The method of claim 13 wherein:
the step of altering comprises altering the bit order of at least some portion of the conversion target.

15. The method of claim 1 wherein:
the first data protocol is big-endian and the second data protocol is little-endian.

16. The method of claim 1 wherein:
the first data protocol is little-endian and the second data protocol is big-endian.

17. The method of claim 1 wherein:
the source code element comprises a code element selected from the group of: an instruction, an address, memory address, a network address, a pointer, an array, an integer, a floating point number, a character, a string, an aggregate object comprising scalar type objects, initialized data and a socket address.

18. The method of claim 1 wherein:
the selection criteria excludes function pointers.

19. The method of claim 1 wherein:
the selection criteria comprises selecting scalar objects that occupy more than one byte in memory.

20. The method of claim 1 wherein:
the step of selectively identifying conversion targets comprises checking one or more symbol types associated with the source code.

21. The method of claim 1 wherein:
the step of altering further comprises altering a symbol table.

22. The method of claim 1 wherein:

the step of altering further comprises managing relocations.

23. The method of claim 1 further comprising the steps of:

linking the altered processed source code with one or more libraries after the step of altering the processed source code;

selectively identifying additional conversion targets wherein the additional conversion targets comprise instructions associated with calling the linked libraries; and, further restructuring the altered processed source code to compensate for differences between the second protocol and the protocol associated with the libraries, thereby establishing interoperability with the libraries.

* * * * *